United States Patent [19]

Unsworth et al.

[11] Patent Number: 5,153,489
[45] Date of Patent: Oct. 6, 1992

[54] ELECTRIC CURRENT MEASUREMENT APPARATUS FOR A SOLID STATE MOTOR CONTROLLER

[76] Inventors: Peter J. Unsworth, 12 Winterbourne Mews,, Lews, East Sussex, BN7 1HW, England; Li Chen, c/o Ms. Wang Guangxin, The 5th Middle School, Xiangfan City, Hubei Province, China

[21] Appl. No.: 713,428

[22] Filed: Jun. 10, 1991

[51] Int. Cl.$^5$ ............................................. H02P 5/40
[52] U.S. Cl. .................................. 318/490; 318/729; 318/798
[58] Field of Search ............... 318/490, 729, 812, 798, 318/80 S; 361/86–88; 324/158 MG; 388/813, 820

[56] References Cited

U.S. PATENT DOCUMENTS

| | | | |
|---|---|---|---|
| 3,652,924 | 3/1972 | Dieterich et al. | 323/24 |
| 3,693,069 | 9/1972 | Kelley, Jr. et al. | 323/24 |
| 4,482,852 | 11/1984 | Muskovac | 318/729 |
| 4,870,340 | 9/1989 | Kral | 323/235 |

OTHER PUBLICATIONS

"A Comparative Study of Symmetrical Three-Phase Circuits for Phase-Controlled AC Motor Drives", William McMurray, IEEE Transactions on Industry Applications, vol. IA-10, pp. 403–411, May/Jun. 1974.

"Stability Analysis of Induction Motors With SCR Voltage Control", J. A. Melkebeek, Conference Proceedings of the 18th UPEC in Guildford, England, 1983.

"An Equivalent-Circuit Model for Phase-Back Voltage Control of AC Machines", F. M. H. Khater et al., IEEE Transactions on Industry Applications, vol. IA-22, No. 5, Sep./Oct. 1986.

Primary Examiner—David Smith, Jr.

[57] ABSTRACT

An electric induction motor is coupled to a source of alternating current by a thyristor switch. A control circuit triggers the thyristor switch to create conductive and non-conductive states during each cycle of the alternating current. A circuit senses the voltage across the thyristor switch during a non-conductive state. From that sensed voltage and known characteristics of the motor being controlled, the control circuit derives a measurement of the current flowing through the motor in the conductive state of the thyristor switch. One of two different derivation techniques is used depending upon the length of the non-conductive state. The control circuit includes a means for calibrating the derivation of the current measurement for a specific motor.

20 Claims, 4 Drawing Sheets

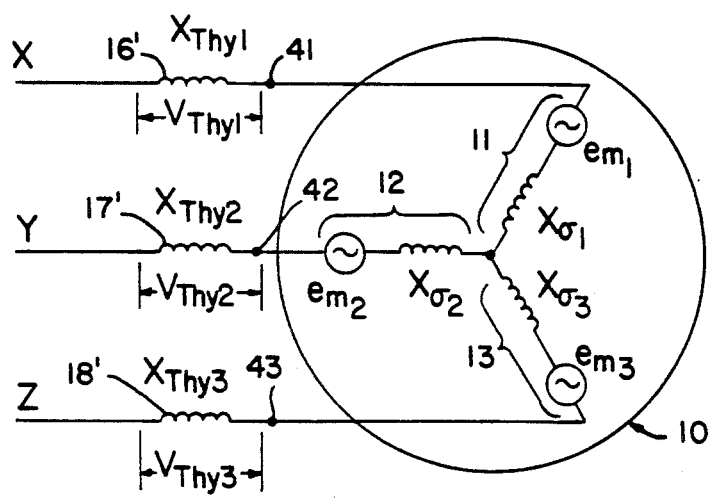
FIG. 2
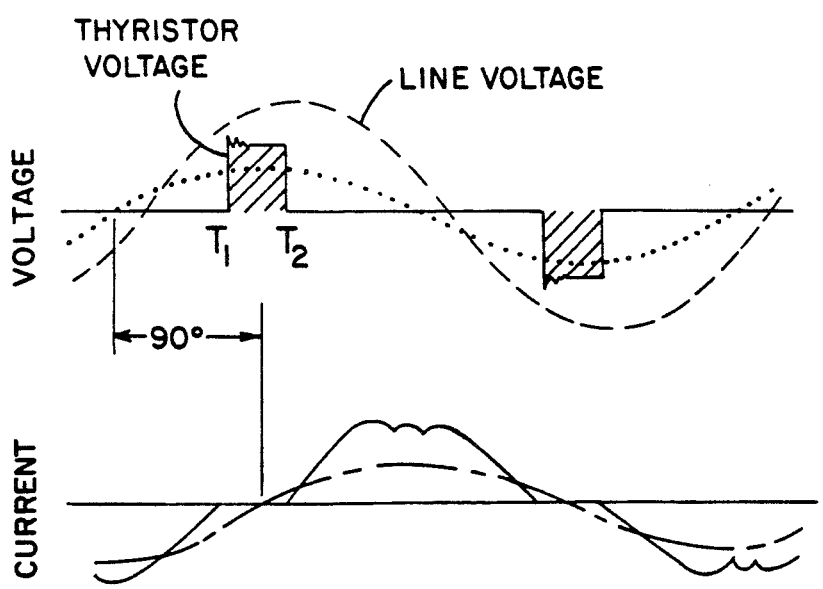
FIG. 3A
FIG. 3B

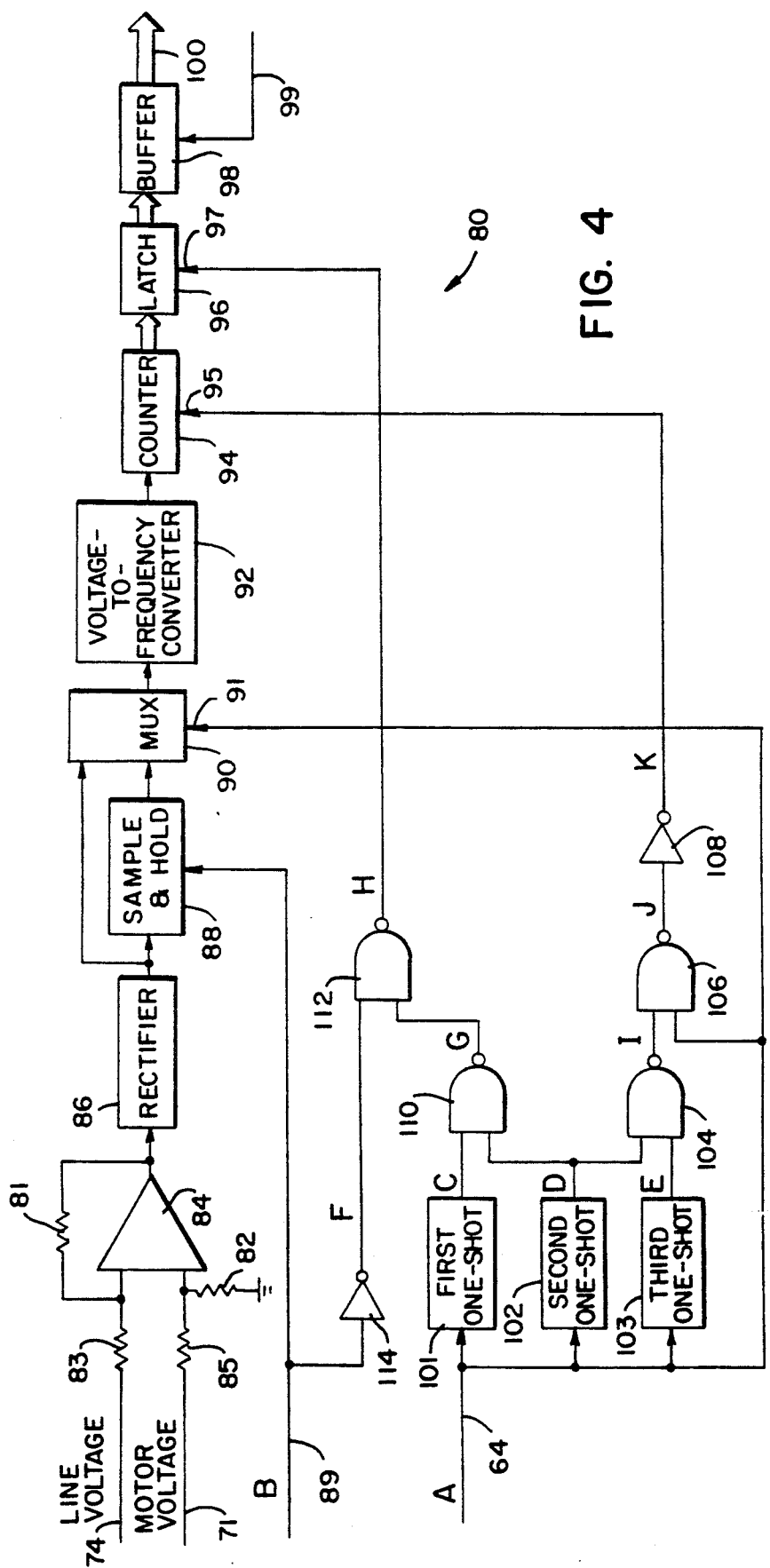

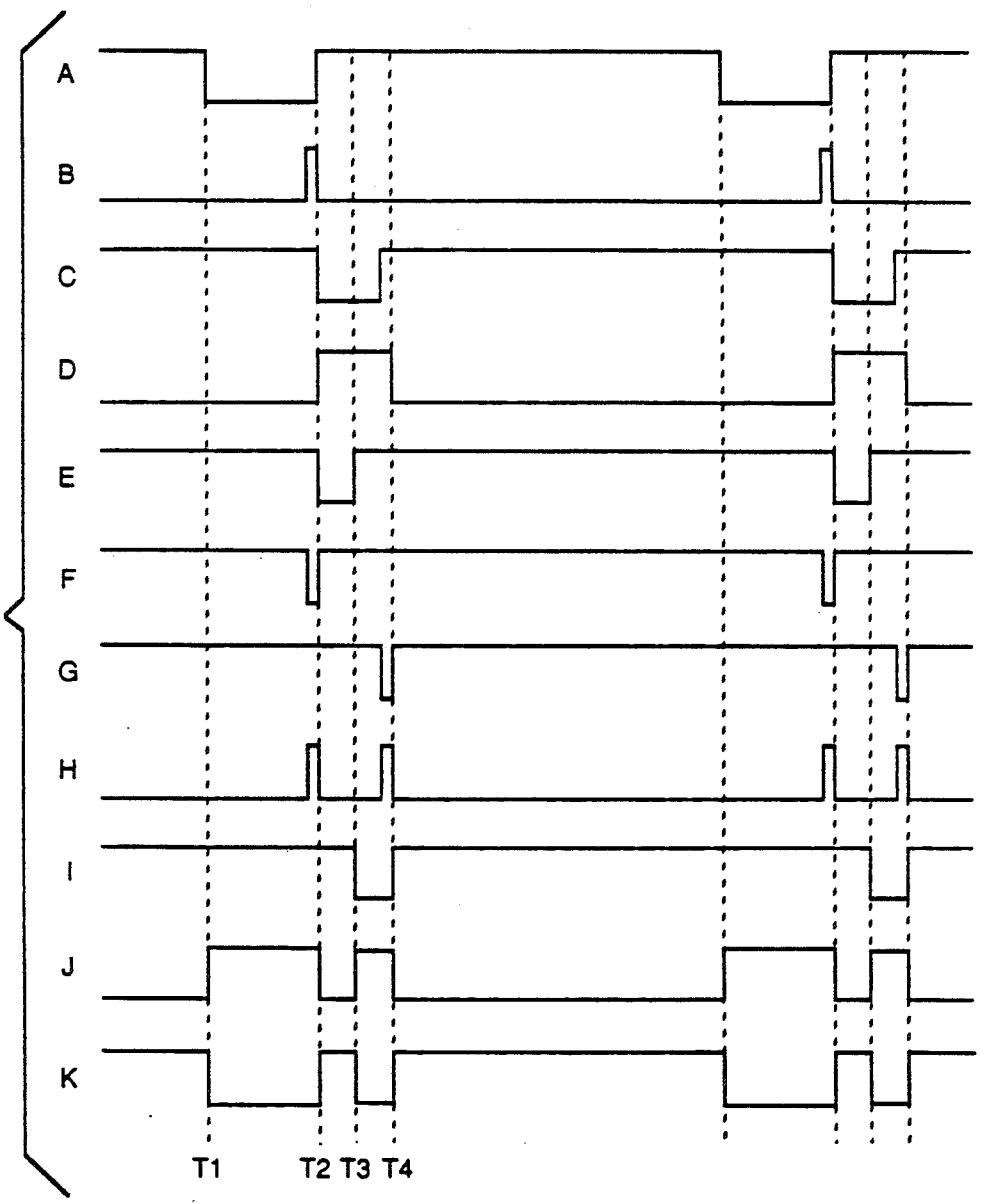

ELECTRIC CURRENT MEASUREMENT APPARATUS FOR A SOLID STATE MOTOR CONTROLLER

BACKGROUND OF THE INVENTION

The present invention relates to systems for controlling the application of power to alternating current induction motors; and in particular to such systems which incorporate a mechanism for measuring the rms value of the current flowing through the motor.

One type of a three-phase induction motor has three wye connected stator windings. A conventional controller for this type of motor has separate thyristor switches connecting a stator winding to one of three alternating current supply lines. Each thyristor switch is formed by either a triac or a pair of inversely connected silicon controller rectifiers (SCR's). A circuit within the controller determines the proper time at which to trigger each thyristor switch during every half-cycle of the associated supply line voltage. A triggered thyristor switch remains in a conductive state until the alternating current flowing through it goes to zero, at which time the thyristor must be triggered to become conductive again. By altering the trigger times of the switches with respect to the zero crossings of the supply line voltage (or with respect to the current cessation time), the intervals during which they are conductive can be varied to control the amount of voltage applied to the motor.

To start the motor, conventional motor controllers vary the thyristor switch trigger times to provide a gradual increase in the voltage. In doing so, the switches are initially triggered relatively late in the voltage half-cycles and are conductive for only a short period. The trigger times then become progressively earlier in each half-cycle to render the thyristor switches conductive for longer intervals and apply greater amounts of voltage to the motor until it reaches full speed. An inverse technique can be used to reduce the motor speed.

Although measuring the rms level of the current flowing through the motor is not required for the operation of the basic motor controller, such measurement often is desirable as an indicator of the malfunction of equipment being driven by the motor. For example, relative changes in the current may reflect a problem along an assembly line and the need to take corrective measures. The current level also can be used to detect a current overload and the need to shut off the motor until the condition that produced the overload is corrected. Heretofore, a current sensing transformer was typically placed in the supply line to produce a signal in its secondary coil that corresponded to the motor current. This signal was measured to provide an indication of the motor current magnitude.

SUMMARY OF THE INVENTION

A electric load, such as a motor, is coupled to a source of alternating current by a switch that is operated by a control circuit. The switch has conductive and non-conductive states, during each cycle of the alternating current. For example, once triggered a thyristor switch stays in a conductive state until the alternating current reaches zero. At that point the thyristor becomes non-conductive until triggered again.

The control circuit has a means which detects when the switch is in a non-conductive state and then signals a sensing circuit to measure the voltage across the switch. In the preferred embodiment of the present invention, the sensing circuit takes two measurements of the voltage across the switch in the non-conductive state. The first measurement is made by integrating the voltage across the switch during substantially the entire non-conduction period. The integration process accounts for variations in the instantaneous voltage which occur during the interval. Secondly the instantaneous voltage across the switch is measured at a predetermined time during the period of non-conduction. This time is chosen so that voltage transients which occur initially when the switch enters the non-conductive state will not appreciably affect the voltage measurement.

From the measured voltage and characteristics of the motor, the control circuit derives a measurement of the current flowing through the motor when said switch means is in a conductive state. The control circuit utilizes the integrated voltage measurement when the non-conductive period lasts longer than a given amount of time. For example, this interval is twenty electrical degrees of a cycle of the alternating supply voltage. For shorter non-conductive periods, the instantaneous voltage measurement is employed to derive the current measurement.

A method of calibrating the control circuit for the specific characteristics of the motor being controlled is utilized. This calibration enables the control circuit to derive the level of current flowing through the motor from the sensed voltage across the switch.

A general object of the present invention is to provide a mechanism for measuring the current flowing through a motor.

A more specific object is to provide such a mechanism that does not place additional elements, such as current transformers, in the supply lines to the motor.

Another object of the present invention is to provide a mechanism for measuring the current that is based on sensing the voltage across a thyristor switch through which the current flows to the motor. The measurement is made during a portion of the alternating current cycle when the switch is in a non-conductive state.

Yet another object is to provide a voltage sensing circuit that takes two alternative measurements of the voltage across a thyristor switch. One measurement accounting for voltage variations that occur during relatively long non-conductive periods of the thyristor switch, while the other measurement technique avoids adverse affects due to transients during short non-conductive periods.

BRIEF DESCRIPTION OF THE DRAWINGS

FIG. 2 is an equivalent electrical circuit for the motor and the SCR's in FIG. 1;

FIGS. 3A and 3B graphically illustrate the voltage across and the current through a pair of SCR's in FIG. 1;

FIG. 4 is a block diagram of the SCR voltage measuring circuit of the motor controller; and FIG. 5 is a waveform diagram of signals at different nodes of the SCR voltage measuring circuit.

DETAILED DESCRIPTION OF THE INVENTION

Figure 1:
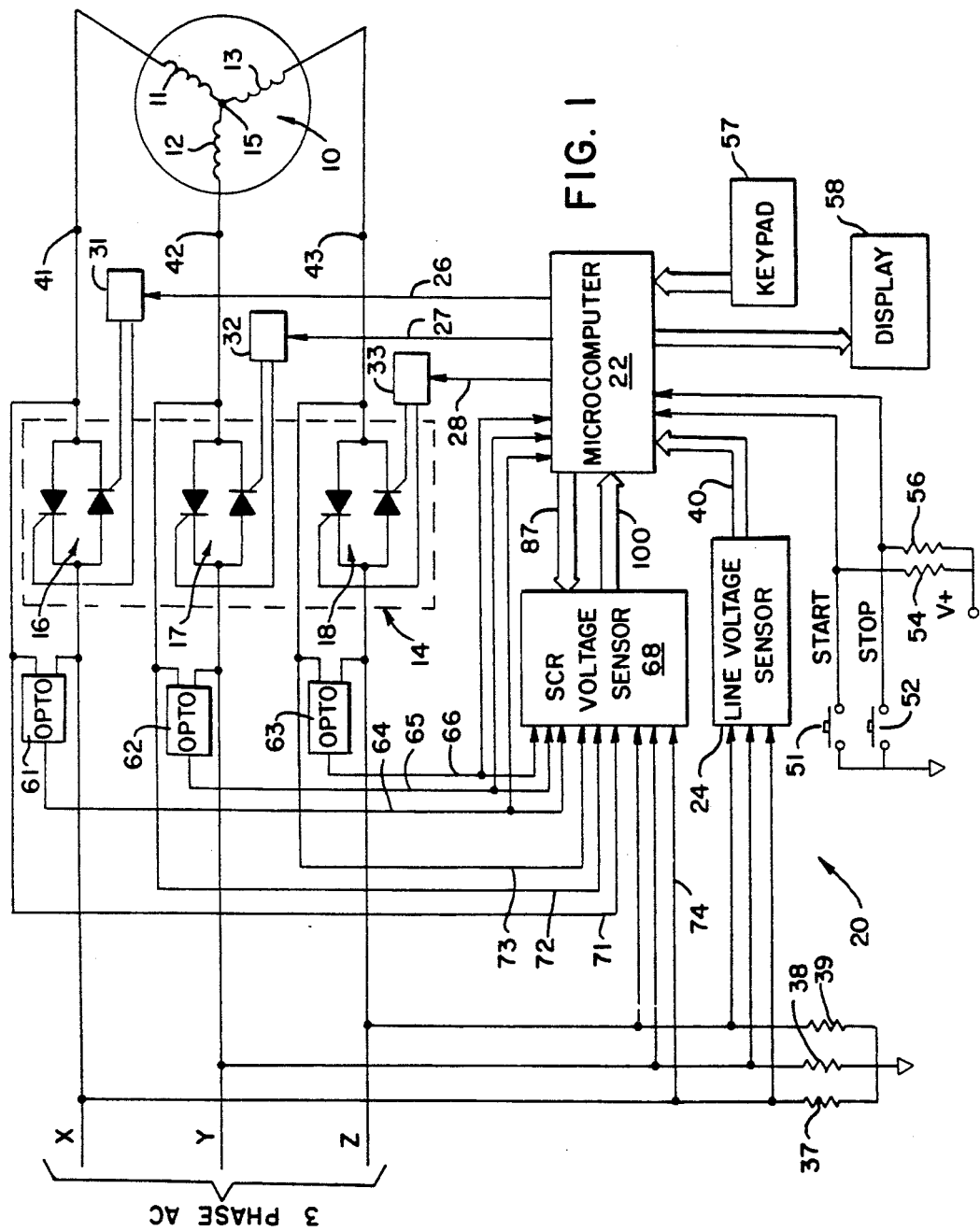
FIG. 1 is a schematic diagram of a three-phase electric motor controller according to the present invention.

The present invention will be described in the context of the exemplary motor controller 20 shown in FIG. 1. An alternating current induction electric motor 10 has three stator windings 11, 12 and 13, which are coupled in a wye connection at neutral node 15. The stator windings 11, 12 and 13 are connected to a source of three-phase electricity by a thyristor switch module 14 and three supply lines designated X, Y and Z. The alternating voltage on supply line X leads the voltage on the Y supply line which in turn leads the Z supply line voltage. The thyristor switch module 14 has three pairs 16, 17, and 18 of inverse-parallel connected SCR's. The SCR's in each pair couple one of the supply lines X, Y or Z to a different stator winding 11, 12 or 13 at motor terminals 41, 42 and 43, respectively. Depending on the level of current to be controlled, a triac can be used in place of each pair of SCR's in the thyristor switch module.

The SCR pairs 16–18 are operated by a control circuit that includes a microcomputer 22, voltage sensor 24, SCR trigger pulse transformers 31–33, and optical-couplers 61–63 connected by other components as will be described. The microcomputer 22 may be one of several commercially available types which contain timer circuits, a read only memory, and a random access memory in the same integrated circuit package. Additional external non-volatile memory, such as an EEPROM, can be provided for the microcomputer. The program for controlling the motor is stored in the read only memory of the microcomputer and is similar to those used in previous motor controllers.

The microcomputer 22 has a parallel output port with three lines 26, 27, and 28. One output line 26 is coupled by pulse transformer 31 to the gate terminals of the first pair of SCR's 16 for electricity supply line X. The other trigger output lines 27 and 28 are coupled by similar pulse transformers 32 and 33 to the gate terminals of the second and third SCR pairs 17 and 18, respectively, for electricity supply lines Y and Z. The microcomputer 22 generates properly timed thyristor trigger pulses on the three lines 26, 27, and 28. Each trigger pulse has a relatively short duration being just long enough to place the corresponding SCR in a conductive state, in which it remains until the magnitude of the alternating current flowing through the SCR goes to zero.

Separate inputs of a line voltage sensor 24 are connected directly to the three a.c. supply lines X, Y and Z and are coupled to the circuit ground by a trio of resistors 37, 38 and 39. The line voltage sensor 24 is similar to the one described in U.S. Pat. No. 4,916,370 and produces signals on bus 40 connected to a set of inputs to the microcomputer 22. One group of these signals indicates the polarity with respect to ground of the voltages across different pairs of the supply lines X, Y and Z. Another group of signals on bus 40 indicate when the voltages across the supply lines make zero crossings. These signals are used by the microcomputer 22 in a conventional manner as references to determine when to trigger the SCR's 16–18 in various modes of operation.

Other input lines of the microcomputer 22 are connected to two manual pushbutton switches 51 and 52, and by a pair of pull-up resistors 54 and 56 to positive supply voltage V+ for the motor controller 20. Activation of switches 51 and 52 pulls the corresponding microcomputer input line to circuit ground. The first switch 51 is closed to start the motor 10 and the second switch 52 is used to stop the motor.

When the user wishes to start the motor 10, switch 51 is closed momentarily, signaling the microcomputer 22 to begin executing a conventional motor starting software routine. The SCR pairs are triggered in a defined circular sequence according to the phase relationships of the voltage on the three supply lines. The software routine gradually triggers each of the SCR pairs 16–18 successively earlier in each half-cycle of the voltage on the phase line X, Y or Z to which each SCR pair is coupled. Eventually, each of the SCR pairs will be triggered to be conductive for substantially the entire half-cycle of the supply line voltage during which they are forward biased. When this occurs, the motor has reached its full operating speed. Thereafter, the SCR pairs continue to be triggered into essentially continuous conductive states. By momentarily closing switch 52, the user signals the microcomputer 22 to terminate triggering the SCR's and terminate the application of electricity to the motor.

The present invention relates to a novel feature of the motor controller 20 which measures the rms level of current flowing through the induction motor 10. The measurement of the current is based on a model of the three-phase motor and the thyristor switches shown in FIG. 2. Each stator winding 11–13 is modelled as a reactance $X\sigma$ connected in series with an alternating voltage source $e_m$. The reactance $X\sigma$ corresponds to a leakage inductance and the alternating voltage source $e_m$ represent the voltage induced in the stator windings by the motor back emf.

The solid line in FIG. 3A illustrates the voltage across a pair of SCR's 16, 17 or 18 in the FIG. 1. This voltage is essentially zero when either SCR of the pair is in a conductive state and changes during non-conduction period (e.g. interval T1 and T2) in each half-cycle of the a.c. supply voltage, represented by the dashed line. The fundamental component of the voltage across the SCR pair is shown by the dotted line. The voltage across the non-conducting SCR's, or thyristors, is produced by the difference between the instantaneous supply line voltage and the motor terminal voltage. The motor current, illustrated by a solid line in FIG. 3B, is a pulsating waveform which has a fundamental sinusoidal component depicted by the broken line. A comparison of FIGS. 3A and 3B indicates a phase shift of $\pi/2$ between the fundamental components of the voltage and the current, denoting that each thyristor switch (SCR pairs 16, 17 and 18) may be modelled in FIG. 2 as a reactance $X_{thy}$ (16', 17' or 18') in series with the associated stator winding.

For a three phase motor, the SCR reactance in each phase line is given by the expression:

$$X_{thy} = \left[ \frac{\left(\frac{3}{2\pi}\right)(\gamma + \sin\gamma)}{1 - \left[\left(\frac{3}{2\pi}\right)(\gamma + \sin\gamma)\right]} \right] X\sigma = [f(\gamma)]X\sigma \quad (1)$$

when the angle $\gamma$ of the period during each half cycle of the alternating supply voltage in which the pair of SCR's are non-conductive has a value between zero and sixty electrical degrees, the range of operation provided by the motor controller 20.

An expression for the voltage across the pair of SCR's can be derived from equation (1), yielding the expression:

$$V_{thy} = \frac{3}{2} \frac{X\sigma}{\left[1 - \left(\frac{3}{2\pi}\right)(\gamma + \sin\gamma)\right]} I\cos(\omega t - \phi) \quad (2)$$

where I is the amplitude of the fundamental component of the current through the associated motor stator winding, $\omega$ is the angular frequency of the alternating current from the supply line, and $\phi$ is the electrical angle at the midpoint of the switch's non-conductive period. The relationship between the fundamental component of the current I and its rms value, using $I_{rms} = I/\sqrt{2}$, is given by the expression:

$$\frac{I}{I_{rms}} = \sqrt{\frac{3}{\pi}} \frac{(2\pi - 3\gamma - 3\sin\gamma)}{\sqrt{18(\pi - \gamma) + \cos\gamma(9\gamma - 12\pi) - 27\sin\gamma}} = \frac{1}{F(\gamma)} \quad (3)$$

If the voltage across the thyristor switch while it is in a non-conducting state is known, equation (2) can be solved for the total current in that supply line, and then equation (3) can be used to derive the rms level of that current.

However, the thyristor voltage during the non-conduction period is not constant and varies to a greater degree as the period becomes longer. Therefore, as a alternative to deriving the current from a single voltage measurement, greater accuracy can be obtained for longer periods of non-conduction by using the area under the a.c. supply voltage waveform between times T1 and T2 in FIG. 3A. This area, indicated by the cross hatching in the drawing, is found by integrating the voltage across the thyristor during the non-conduction period, as given by the expression:

$$\text{Area} = \int_{\phi-\gamma/2}^{\phi+\gamma/2} V_{thy} d(\omega t) = 3X\sigma[1 + f(\gamma)]I\sin(\gamma/2). \quad (4)$$

Equation (4) produces the following expression for the rms current level as a function of the area:

$$I_{rms} = \left(\frac{F(\gamma)}{3X\sigma(1 + f(\gamma))}\right)\left(\frac{\text{Area}}{\sin(\gamma/2)}\right) \quad (5)$$

where the functions $f(\gamma)$ and $F(\gamma)$ are defined by equations (1) and (3) respectively.

As illustrated in FIG. 3A, the voltage at the beginning of the thyristor non-conduction period (e.g. at T1) may be affected by transients, such as ringing produced by snubber circuits across the thyristors. Such transients can have a significant affect on the accuracy of current derivation based on area computation for relatively short non-conductive periods. As a result, the initial transients and the voltage variation during the non-conduction period must be taken into account for optimum accuracy in the current measurement process. Therefore, for relatively short periods of non-conduction, an instantaneous voltage measurement is taken just before the thyristor is triggered at time T2. However, for longer periods (e.g. greater than twenty electrical degrees) the current level is derived from the integrated thyristor voltage.

Referring again to FIG. 1, additional components have been incorporated into the motor controller 20 to determine the rms level of the current flowing through each stator winding 11–13 of the motor 10. A separate optical-coupler (opto) 61, 62 or 63 is connected across each pair of SCR's 16–18. The optical-couplers 61–63 include full wave rectifiers at their inputs enabling the production of signals on lines 64, 65 or 66 whenever the absolute value of the voltage across the associated SCR pair exceeds the normal forward voltage drop, as occurs when the SCR pair is non-conductive. The signals from the optical-couplers are applied to a SCR voltage sensor 68 which also receives voltage levels from both sides of the SCR pairs. Specifically the SCR voltage sensor 68 has three input lines connected to the supply lines X, Y and Z, and three other input lines connected to the motor terminals 41–43. The SCR voltage sensor 68 detects the voltage difference between the two input lines associated with each electrical phase to measure the voltage $V_{thy}$ across the corresponding pair of SCR's. These voltage measurements are sent over bus 100 to the microcomputer 22 which uses the measurements to derive the motor current, as will be described.

The SCR voltage sensor 68 comprises three identical circuits for measuring the voltage across the SCR's in a given phase line. The details of one of these circuits 80 for supply line X is shown in FIG. 4. Conductors 71 and 74 respectively carry the supply line voltage and motor terminal voltage and are coupled by separate resistors 83 and 85 to a differential amplifier 84. The output of the differential amplifier 84 represents the difference between the supply line and motor terminal voltage levels and therefore the voltage across the pair of SCR's 16 for supply line X. The output of the differential amplifier 84 is rectified by circuit 86 so that it always has a non-negative voltage level with respect to circuit ground.

The rectified SCR voltage level is applied to the input of a sample and hold circuit 88 which responds to a signal on line 89 from the microcomputer 22 to capture the rectified voltage level. The output of the sample and hold circuit 88 is applied to one input of a two-to-one multiplexer (MUX) 90 which directly receives the output of the rectifier circuit 86 at its other input. The multiplexer responds to a control signal at a selector terminal 91 by coupling one of the two inputs to a voltage-to-frequency converter 92. This converter 92 is a standard device which produces an output signal having a frequency that varies with the magnitude of the input voltage level from the multiplexer 90. For example, the output signal from the voltage-to-frequency converter is 500 kHz when the voltage difference across the SCR's is at the maximum value encountered in normal operation.

The output signal from the voltage-to-frequency converter 92 is applied to the input of a twelve-bit digital counter 94 which counts the number of cycles of the input signal until the counter is reset by a signal applied to terminal 95. The digital output of the counter 94 is connected to a set of data latches 96 which store the counter output value upon the receipt of an enable signal control terminal 97. The output of the set of latches is connected to the inputs of a set of tri-state data buffers 89 coupled by bus 100 to the microcomputer 22. The microcomputer periodically selects the output from each of the voltage measuring circuit buffers 98 by applying a control signal to line 99 in group 87 from the microcomputer 22. In this manner, the microcomputer 22 can read the output from the voltage measuring circuits 80 associated with each pair of SCR's 16-18.

The remaining elements of the SCR voltage sensor circuit 80 produce signals for controlling the previously described components and will be described in the context of the circuit's operation with reference to the signal waveforms illustrated in FIG. 5. The reference letters on conductors in FIG. 4 denote which waveform in FIG. 5 depicts the signal on carried by that conductor. Waveform A represents the output of the first optical-coupler 61 connected across the first pair of SCR's 16 in a.c. supply line X. The output signal on line 64 from the first optical-coupler has a relatively high logic level whenever one of the SCR's in the first pair 16 is in a conductive state and a low logic level during periods, such as between times T1 and T2 when both SCR's of the first pair are non-conductive. The SCR's in the first pair 16 are triggered into a conductive state by a pulse from the microcomputer 22 and coupling transformer 31 at time T2.

The output from the first optical-coupler 61 is sent over control line 64 to the selector terminal 91 of the multiplexer 90 to choose the input of the multiplexer to be connected to its output. The optical-coupler signal also is applied to three monostable multivibrators 101, 102 and 103, commonly referred to as "one-shots". The rising edge of the optical coupler signal triggers each of the one-shots 101–103 in circuit 80 to produce pulses of different duration and logic levels, as respectively indicated by waveforms C, D, and E in FIG. 5. Specifically, the second one-shot 102 produces waveform D having a high level pulse during the interval from T2 to T4, which is about two milliseconds in duration, for example. The first one-shot 101 produces waveform C that has a low level pulse beginning at T2 and terminating approximately 0.1 millisecond before time T4. Finally, the third one-shot 103 produces waveform E having a low level pulse between times T2 and T3, which is approximately one millisecond in duration, for example.

The output signals from the second and third one-shots 102 and 103 are coupled to inputs of a first NAND gate 104 to produce a signal depicted in waveform I. This signal is combined in a second NAND gate 106 with the optical-coupler signal (waveform A) to produce control signal waveform J. This latter control signal is passed through a first inverter 108 and the resultant signal (waveform K) is applied to the reset terminal 95 of counter 94.

The outputs of the first and second one-shots 101 and 102 are connected to inputs of a third NAND gate 110 to produce control signal waveform G. This signal from the output of the third NAND gate 110 is coupled to an input of a fourth NAND gate 112.

The microcomputer 22 issues a trigger signal to the first pair of SCR's 16 at time T2. About 0.1 millisecond before that time, the microcomputer sends a short pulse shown in waveform B to the SCR voltage sensor circuit 80 over line 89. This pulse is coupled directly to the control input of sample and hold circuit 88, and by a second inverter 114 to another input of the fourth NAND gate 112. The inverted signal (waveform F) is combined in the fourth NAND gate 112 with the signal from the third NAND gate 110 to produce a control signal depicted in waveform H. The control signal from fourth NAND gate's output is connected to the enable input terminal 97 of the set of data latches 96.

With continuing reference to FIGS. 1 and 4, when the current passing through the first pair of SCR's 16 drops to zero at time T1, the voltage across these SCR's increases dramatically. Thus, a measurable difference exists between the supply line X voltage and the motor voltage at terminal 41. These respective voltage levels are applied by conductors 71 and 74 and resistors 83 and 85 to the inputs of the differential amplifier 84. The output of the differential amplifier is proportional to the magnitude of the difference between these voltage levels and is rectified in circuit 86 to produce a signal corresponding to the absolute value of the voltage difference. This value is applied directly to the multiplexer 90 and to the sample and hold circuit 88.

The increase in voltage across the first pair of SCR's 16 at time T1 causes the first optical-coupler 61 to produce a low level output signal (waveform A in FIG. 5), which is applied over line 64 to selector terminal 91 of multiplexer 90. The multiplexer 90 responds to this low level signal by coupling its input, that is connected directly to the output of the rectifier circuit 86, to the voltage-to-frequency converter 92. The voltage-to-frequency converter 92 produces an output signal having a frequency which corresponds to and varies with changes of the voltage difference detected by the differential amplifier 84. The cycles of the output signal from the voltage-to-frequency converter 92 are counted by counter 94, which was reset to zero prior to time T1 by a high level signal (waveform K) at its reset terminal 95.

The high level pulse sent by the microcomputer 22 over line 89 (waveform B) to the SCR voltage sensor circuit 80 just before time T2 causes the sample and hold circuit 88 to store the absolute voltage difference from rectifier 86. The pulse on line 89 also produces a high logic level pulse for about 0.1 millisecond at the output of the fourth NAND gate 112 (waveform H). When this high logic level is applied to the enable terminal 97, the set of data latches 96 stores the output ($N_A$) of counter 94 at that moment in time.

The microcomputer 22 at time T2 sends a trigger pulse to the first pair of SCR's 16. The trigger pulse renders the first pair of SCR's 16 conductive and the voltage level across them drops essentially to zero at that time T2. The drop in voltage across the first pair of SCR's 16 causes the signal on line 64 from the first optical-coupler 61 to rise to a high logic level, as shown by waveform A. The rise of this signal level has several effects on the SCR voltage sensor circuit 80 in FIG. 4. Firstly, the selection of inputs by multiplexer 90 changes to connect the output of the sample and hold circuit 88 to the voltage-to-frequency converter 92. Secondly, the rising edge of the signal on line 89 triggers the three one-shots 101–103, producing output pulses at time T2 indicated by waveforms C, D and E, respectively. Thirdly, the transition on line 64, applied through the second NAND gate 106 and the inverter 108, resets counter 94, since the previous count is now stored in the set of data latches 96. This high level reset signal holds counter 94 at zero during the interval T2 to T3.

At some point between times T2 and T3, the microcomputer 22 transmits a high logic level signal over control line 99 to the data buffers 98 which respond by coupling the contents ($N_A$) of the set of latches 96 onto the data bus 100. The value $N_A$, representing the integrated voltage across the first pair of SCR's 16, is stored within the microcomputer's memory for later processing, as will be described.

When the third one-shot 103 times out at time T3, its output (waveform E) again goes to a high logic level which results in a low logic level being applied to the reset terminal 95 of the counter 94 (waveform K). As a result, the counter comes out of the reset state to once again count cycles of the signal from the voltage-to-frequency converter 92. At this time, the converter 92 receives the output from the sample and hold circuit 88, which is a constant voltage level corresponding to the SCR voltage stored at time T2. Therefore, the voltage-to-frequency converter 92 generate a signal having a constant frequency during this period of operation. The counter 94 is enabled to count the cycles of this frequency signal until the output of inverter 108 (waveform C) again goes to a high logic level. This subsequent counting period, T3 to T4, is sufficiently long (e g. 1.06 milliseconds) to produce a digital value ($N_V$) from the counter 94 that is scaled to a range which can be manipulated easily by the microcomputer 22.

The first one-shot 101 times out about 0.1 millisecond prior to time T4. This action produces another high logic level pulse at the output of the fourth NAND gate 112 (waveform H), the falling edge of which causes data latches 96 to store another value from counter 94. This counter value, designated $N_V$, corresponds to the instantaneous voltage difference level stored in the sample and hold circuit 88 just prior to triggering the first pair of SCR's 16 at time T2.

The second one-shot 102 then times out at time T4, producing a low logic level output signal. This signal causes the output of the fourth NAND gate 112 (waveform H) to return to a low logic level, terminating the storage mode of the data latches 96. The timing out of the second one-shot 102 also resets the counter 94 at time T4 until another non-conducting period of the first pair of SCR's 16.

At some point shortly after time T4, the microcomputer 22 reads and stores the contents ($N_V$) of the set of latches 96 by again enabling data buffers 98. Thereafter, the microcomputer memory contains counter values $N_A$ and $N_V$, indicative of the voltage across the first pair of SCR's 16 during its most recent non-conducting period. Counter value $N_A$ corresponds to the integrated voltage difference during the non-conducting period and the second acquired counter value $N_V$ corresponds to the instantaneous voltage level just prior to the end of that non-conducting period.

Which one of these counter values the microcomputer 22 uses to calculate the motor current depends upon the length of the non-conducting interval. As noted previously, when this interval is less than twenty electrical degrees of the a.c. voltage cycle, transients at the beginning of the period substantially affect the integrated voltage difference and counter value $N_A$. Thus, for relatively short non-conducting periods, counter value $N_V$ will be used as indicative of the thyristor voltage $V_{thy}$. However, when the non-conduction period is equal to or greater than twenty electrical degrees of the a.c voltage cycle, counter value $N_A$ is used, since the effects of transients at the beginning of the period are diluted by the integration process. Furthermore, since the voltage difference during long non-conducting periods varies, counter value $N_A$ more accurately represents the thyristor voltage $V_{thy}$. Microcomputer 22 uses the signal produced by the first optical-coupler 61 to measure the duration of the non-conducting period, and thereby determine which of the two counter values $N_A$ or $N_V$ to utilize for a given half cycle of the a.c. supply line voltage.

Alternatively, the size of the area under the a.c. supply voltage waveform between times T1 and T2, i.e. the magnitude of counter value $N_A$, can be used to select the method for determining the current. When this value is above a given threshold, it is used to calculate the motor current, otherwise counter value $N_V$ is used.

The counter values $N_A$ and $N_V$ read by the microcomputer 22 are affected by the gain of the differential amplifier 84 and the conversion ratio of the voltage-to-frequency converter 92. Specifically, value $N_A$ representing the area under the SCR voltage waveform during the non-conduction period is given by:

$$N_A = \int f_c dt = \frac{k_f}{\omega} \int V_{thy} d(\omega t) = \frac{k_f}{\omega} \text{Area} \quad (6)$$

where $f_c$ is the converter signal frequency and $k_f$ is a constant of proportionality for both the differential amplifier gain and the conversion ratio ($f/V_{thy}$) of the voltage-to-frequency converter 92. Modifying equation (5) with the relationship of equation (6) yields:

$$I_{rms} = \left(\frac{\omega}{3k_f X \sigma}\right)\left(\frac{F(\gamma)}{(1 + f(\gamma))\sin(\gamma/2)}\right) N_A \quad (7)$$

which can be rewritten as:

$$I_{rms} = L \cdot G(\gamma) \cdot N_A \quad (8)$$

where L and $G(\gamma)$ are shorthand representations of the first two terms on the right side of equation (7).

Similarly the counter value $N_V$ used to derive the rms current for short conduction periods is denoted by the expression:

$$N_V = \int_\tau f dt = \int_\tau k_f V_{thy} dt \quad (9)$$

where $\tau$ is the fixed interval over which the cycles of the signal from the voltage-to-frequency converter are counted. Combining equation (9) with equation (3) produces:

$$I_{rms} = \left(\frac{\omega}{3k_f X \sigma}\right)\left(\frac{2}{\omega \tau}\right)\left(\frac{F(\gamma)}{(1 + f(\gamma))\cos(\gamma/2)}\right) N_V \quad (10)$$

which can be rewritten as:

$$I_{rms} = L \cdot M \cdot H(\gamma) \cdot N_V \quad (11)$$

where L, M and $H(\gamma)$ are shorthand representations of the first three terms on the right side of equation (10).

The microcomputer solves equations (8) and (11) for the value of the rms current which is displayed on display 58. Factors $G(\gamma)$ and $H(\gamma)$ in these equations are functions of the length $\gamma$ of the non-conduction period. Values for these factors are stored in separate look-up tables within the memory of the microcomputer 22 for values of $\gamma$ ranging from zero to sixty degrees in one-quarter degree increments. The length of the non-conduction period for each SCR pair 16–18 is determined by timing the duration of each low level pulse in the signal from the associated optical-coupler 61-63. The timing is performed by incrementing a software counter within the microcomputer 22, every microsecond. For example, a sixty degree period of a sixty Hertz supply line voltage is one-sixth of a cycle and corresponds to a interval of time given by one-sixth multiplied by one-sixtieth of a second, or approximately 2778 microseconds. To convert the length of the non-conduction period $\gamma$ from microseconds to electrical degrees, the microcomputer solves the equation $\gamma_{deg}=(60/2778)\gamma_{\mu s}$. By multiplying the solution by four gives the angular length in terms of one-quarter degree increments for addressing the look-up tables to obtain values for $G(\gamma)$ and $H(\gamma)$.

The factor M in equation (11) is a numerical constant which for a counting period $\tau$ of 1.06 microseconds, equals approximately six for a 50 Hertz line voltage and five for a 60 Hertz line voltage for a 2.12 microsecond counting period $\tau$. Factor L is a constant that is dependent upon the characteristics of the specific motor being controlled and is determined by a calibration process performed after installing the motor controller.

The calibration process is initiated by a technician entering a command into a key pad 57 which instructs the microcomputer 22 to trigger the SCR pairs 16-18 in a manner that produces a non-conducting period having a predetermined length. The microcomputer initially uses a default value for factor L to calculate the motor current and numerically present that current on display 58. The technician compares the displayed current level with that measured by an ammeter clapped around supply lines X, Y and Z. If the two measurements are unequal, the technician enters another command into the key pad 57 instructing the microcomputer 22 to increase or decrease the value of L depending upon the direction of the inequality. The motor current is computed again with the new value for L. The calibration steps are repeated until the motor controller 20 displays the correct motor current, at which time the technician terminates the calibration process causing the microcomputer to store the latest values of L in a non-volatile memory.

In installations where less precision in calculating the motor current can be tolerated, a self calibrating method can be used. This process is initiated by the technician entering an appropriate command into key pad 57. The microcomputer 22 responds by setting the non-conduction period to a predetermined length, such as sixty electrical degrees, which is insufficient to start movement of the motor 10. A phase-angle at which to trigger the SCR's to produce a non-conduction period of the predetermined length is preprogrammed into the microcomputer.

At sixty electrical degrees, the motor current will be approximately fifty percent of the full load current. The full load current level for a particular motor, as specified by its manufacturer, is entered into key pad 57. From this value and the SCR voltage measured at a sixty degree non-conduction period, the microcomputer 22 can mathematically derive an approximate value for factor L.

As an alternative the microcomputer 22 may have an internal analog-to-digital converter which can directly measure the instantaneous voltage. In this embodiment, the sample and hold circuit 88 is eliminated and a counter value $N_V$ is not produced. The value $N_A$ still is derived and used as described previously. The output of the rectifier 86 is fed to an input of the internal analog-to-digital converter. The digitized voltage value $V_{ADC}$ from the converter is read at the same instant in time that the sample and hold circuit was triggered in the previous embodiment.

However, a different equation must be used to calculate the rms current from the digitized voltage value $V_{ADC}$ than was used with counter value $N_V$. The voltage across the thyristor $V_{thy}$ is calculated according to the expression:

$$V_{thy}=V_{ADC}k_{REF} \tag{12}$$

where $k_f$ is a constant of proportionality for both the differential amplifier gain and the conversion factor of the analog-to-digital converter. The thyristor voltage then is used to derived the rms current as given by:

$$I_{rms} = \frac{1}{X\sigma} \left( \frac{F(\gamma)}{(1 + f(\gamma))\cos(\gamma/2)} \right) V_{thy} \tag{13}$$

which can be expressed as:

$$I_{rms}=X\sigma \cdot H(\gamma) \cdot V_{thy} \tag{11}$$

A value for $H(\gamma)$ can be found in a look up table using the length of the non-conduction period $\gamma$ and the value for $X\sigma$ is determined by the calibration process.

Although the invention has been described in terms of a motor controller that senses the current level in each supply line, other controllers can utilize the basis concepts of this invention to measure the current in less than all the supply lines for the motor. For example, the current can be detected in two lines of a three-phase, three-wire circuit and from those two current levels the current in the third line can be calculated. In addition the present invention can be applied to other types of electrical loads which exhibit similar characteristics as a motor.

We claim:

1. An apparatus, which applies alternating current to an electric load, comprising:
    a switch coupling the load to a source of the alternating current and having conductive and non-conductive states;
    a control circuit connected to said switch to place the switch in both the conductive and non-conductive states during each of a plurality of cycles of the alternating current;
    a detector which determines when said switch is in a non-conductive state;
    a means, coupled to said detector, for sensing the voltage across said switch in the non-conductive state; and
    a means for producing, from the sensed voltage, a measurement of current flowing to the load when said switch is in a conductive state.

2. The apparatus as recited in claim 1 wherein said means for sensing integrates the level of voltage across said switch during the non-conductive state; and said means for producing derives the measurement of the level of current from a result of the integration.

3. The apparatus as recited in claim 2 wherein said means for producing derives the measurement of the current (I) according to the expression:

$$I = \left(\frac{\omega}{3k_fX\sigma}\right)\left(\frac{F(\gamma)}{(1 + f(\gamma))\sin(\gamma/2)}\right)N_A$$

where $\omega$ is the angular frequency of the alternating current, $X\sigma$ is a reactance of the load, $k_f$ is a proportionality constant, $\gamma$ is a duration of the non-conductive state in terms of degrees of a cycle of the alternating current, and $N_A$ is a numerical value corresponding to the integrated voltage across said switch, the value for $F(\gamma)$ is given by the expression:

$$\frac{1}{F(\gamma)} = \sqrt{\frac{3}{\pi}} \frac{(2\pi - 3\gamma - 3\sin\gamma)}{\sqrt{18(\pi - \gamma) + \cos\gamma(9\gamma - 12\pi) - 27\sin\gamma}}$$

and the value for $f(\gamma)$ is given by the expression:

$$f(\gamma) = \left[\frac{\left(\frac{3}{2\pi}\right)(\gamma + \sin\gamma)}{1 - \left[\left(\frac{3}{2\pi}\right)(\gamma + \sin\gamma)\right]}\right].$$

4. The apparatus as recited in claim 1 wherein said means for sensing produces a first value which corresponds to the integral of the voltage across said switch during the non-conductive state, and produces a second value which corresponds to the level of voltage at a predefined time during the non-conductive state.

5. The apparatus as recited in claim 4 wherein said means for producing derives the measurement of the current from the first value when the non-conductive state lasts for longer than a predefined interval, or from the second value when the non-conductive state lasts for less than the predefined interval.

6. The apparatus as recited in claim 4 wherein said means for producing derives the measurement of the current from the first value when the first value is larger that a given threshold, otherwise the measurement of the current is derived from the second value.

7. The apparatus as recited in claim 1 wherein said a means for sensing the voltage across said switch comprises:
a differential amplifier which produces an output voltage level corresponding to the voltage across said switch;
a voltage to frequency converter producing a signal that has a frequency which represents the magnitude of the output voltage levels; and
means four counting cycles of the signal from said voltage to frequency converter and being connected to apply a cycle count to said means for producing a measurement of current.

8. An apparatus for controlling the application of alternating current to an electric load, said apparatus comprising:
a switch coupling the load to a source of the alternating current and having conductive and non-conductive states;
a detector which determines when said switch is in a non-conductive state;
a differential amplifier which produces an output voltage level corresponding to the voltage across said switch;
means, responsive to said detector, for storing the output voltage level at a defined instant of time during the non-conductive state;
a voltage to frequency converter having an input and producing a signal having a frequency which represents the magnitude of a voltage level applied to the input;
means connecting the stored output level from said means for storing to the input of said voltage to frequency converter;
means for counting cycles of the signal for a given interval of time $\tau$ and producing a count $N_V$;
a means for producing, from the count $N_V$, a measurement of current flowing to the load when said switch is in a conductive state.

9. The apparatus as recited in claim 8 wherein said means for producing derives the measurement of the current (I) according to the expression:

$$I = \left(\frac{\omega}{3k_fX\sigma}\right)\left(\frac{2}{\omega\tau}\right)\left(\frac{F(\gamma)}{(1 + f(\gamma))\cos(\gamma/2)}\right)N_V$$

where $\omega$ is the angular frequency of the alternating current, $X\sigma$ is a reactance of the load, $k_f$ is a proportionally constant, $\gamma$ is a duration of the non-conductive state in terms of degrees of an alternating current cycle, and where the value for $F(\gamma)$ is given by the expression:

$$\frac{1}{F(\gamma)} = \sqrt{\frac{3}{\pi}} \frac{(2\pi - 3\gamma - 3\sin\gamma)}{\sqrt{18(\pi - \gamma) + \cos\gamma(9\gamma - 12\pi) - 27\sin\gamma}}$$

and the value for $f(\gamma)$ is given by the expression:

$$f(\gamma) = \left[\frac{\left(\frac{3}{2\pi}\right)(\gamma + \sin\gamma)}{1 - \left[\left(\frac{3}{2\pi}\right)(\gamma + \sin\gamma)\right]}\right].$$

10. The apparatus as recited in claim 8 wherein:
said means connecting comprises a multiplexer which couples the output voltage level directly from said differential amplifier to the input of said voltage to frequency converter during the non-conductive state of said switch, and otherwise couples the stored output voltage level from said means for storing to the input of said voltage to frequency converter; and
said means for counting produces a first count $N_A$ of the cycles that occur during the non-conductive state of said switch, and produces a second count $N_V$ during the given interval $\tau$ when the stored output voltage level is being applied to the input of said voltage to frequency converter, the first and second counts being applied to said means for producing a measurement of current.

11. The apparatus as recited in claim 10 wherein said means for producing a measurement of the current derives that measurement from the first count $N_A$ when the non-conductive state last for longer that a predefined interval, and from the second count $N_V$ when the non-conductive state lasts for less than the predefined interval.

12. The apparatus as recited in claim 10 wherein said means for producing derives the measurement of the current (I) according to the expression:

$$I = \left(\frac{\omega}{3k_f X\sigma}\right)\left(\frac{F(\gamma)}{(1 + f(\gamma))\sin(\gamma/2)}\right)N_A$$

when the non-conductive state lasts for longer than a defined interval and from the following expression when the non-conductive state lasts for less than the defined interval;

$$I = \left(\frac{\omega}{3k_f X\sigma}\right)\left(\frac{2}{\omega\tau}\right)\left(\frac{F(\gamma)}{(1 + f(\gamma))\cos(\gamma/2)}\right)N_V$$

where $\omega$ is the angular frequency of the alternating current, $X\sigma$ is a reactance of the load, $k_f$ is a proportionally constant and $\gamma$ is a duration of the non-conductive state in terms of degrees of an alternating current cycle, the value for $F(\gamma)$ is given by the expression:

$$\frac{1}{F(\gamma)} = \sqrt{\frac{3}{\pi}} \frac{(2\pi - 3\gamma - 3\sin\gamma)}{\sqrt{18(\pi - \gamma) + \cos\gamma(9\gamma - 12\pi) - 27\sin\gamma}}$$

and the value for $f(\gamma)$ is given by the expression:

$$f(\gamma) = \left[\frac{\left(\frac{3}{2\pi}\right)(\gamma + \sin\gamma)}{1 - \left[\left(\frac{3}{2\pi}\right)(\gamma + \sin\gamma)\right]}\right].$$

13. An apparatus for controlling an electric motor which is supplied by a three-phase source of alternating current, said apparatus comprising:
   three switch means, each of which coupling a different phase of the source to the electric motor and having conductive and non-conductive states;
   a control circuit connected to said three switch means to place each of said switch means in both the conductive and non-conductive states during each of a plurality of cycles of the alternating current for the respective phase;
   a detector which determines when each of said switch means is in a non-conductive state;
   a means, coupled to said detector, for sensing the voltage across each of said switch means during a non-conductive state; and
   means for producing, from the sensed voltage, a measurement of current flowing through each of said switch means during a conductive state.

14. The apparatus as recited in claim 13 wherein said means for sensing integrates the level of voltage across each of said switch means during periods of non-conduction; and said means for producing derives the measurement of the current from a result of the integration.

15. The apparatus as recited in claim 13 wherein said means for sensing produces a first value which corresponds to the integral of the voltage across each of said switch means during periods of non-conduction, and produces a second value which corresponds to the level of voltage across each of said switch means at a predetermined instant in time during periods of non-conduction.

16. The apparatus as recited in claim 15 wherein said means for producing derives the measurement of the current from the first value when the period of non-conduction is longer than a given length of time; or from the second value when the period of non-conduction is shorter than the given length of time.

17. The apparatus as recited in claim 15 wherein said means for producing derives the measurement of the current from the first value when the first value is larger that a given threshold, otherwise the measurement of the current is derived from the second value.

18. The apparatus as recited in claim 15 wherein said a means for sensing the voltage across said switch means comprises:
   a differential amplifier which produces an output voltage level corresponding to the voltage across one of said switch means;
   means for storing the output voltage level at a defined instant of time during a non-conductive period of the one switch means;
   a voltage to frequency converter with an input and producing a signal having a frequency which represents the magnitude of a voltage level applied to the input;
   means for applying the output voltage level directly from said differential amplifier to the input of said voltage to frequency converter during the period of non-conduction of the one switch means, and otherwise applying the stored output voltage level to the input of said voltage to frequency converter; and
   means for counting cycles of the signal to produce a first count $N_A$ of the cycles that occur during the period of non-conduction, and a second count $N_V$ during the given interval $\tau$ when the output voltage level is being applied to the input of said voltage to frequency converter, the first and second counts being applied to said means for producing a measurement of current.

19. The apparatus as recited in claim 18 wherein said means for producing a measurement of the current derives that measurement from the first count $N_A$ when the period of non-conductive is longer than a given length of time, and from the second count $N_V$ when the non-conduction is shorter than the given length of time.

20. The apparatus as recited in claim 18 wherein said means for producing derives the measurement of the current (I) according to the expression:

$$I = \left(\frac{\omega}{3k_f X\sigma}\right)\left(\frac{F(\gamma)}{(1 + f(\gamma))\sin(\gamma/2)}\right)N_A$$

when the period of non-conduction is longer than a given length to time; and from the following expression when the period of non-conduction is shorter that the given length of time:

$$I = \left(\frac{\omega}{3k_f X\sigma}\right)\left(\frac{2}{\omega\tau}\right)\left(\frac{F(\gamma)}{(1 + f(\gamma))\cos(\gamma/2)}\right)N_V$$

where $\omega$ is the angular frequency of the alternating current, $X\sigma$ is a reactance of the load, $k_f$ is a proportionally constant, and $\gamma$ is a duration of the non-conductive period in terms of degrees of a cycle of the alternating current, the value for F(γ) is given by the expression:

$$\frac{1}{F(\gamma)} = \sqrt{\frac{3}{\pi}} \frac{(2\pi - 3\gamma - 3\sin\gamma)}{\sqrt{18(\pi - \gamma) + \cos\gamma(9\gamma - 12\pi) - 27\sin\gamma}}$$

and the value for f(γ) is given by the expression:

$$f(\gamma) = \left[ \frac{\left(\frac{3}{2\pi}\right)(\gamma + \sin\gamma)}{1 - \left[\left(\frac{3}{2\pi}\right)(\gamma + \sin\gamma)\right]} \right].$$

* * * * *

UNITED STATES PATENT AND TRADEMARK OFFICE
CERTIFICATE OF CORRECTION

PATENT NO. : 5,153,489

DATED : October 6, 1992

INVENTOR(S) : Peter J. Unsworth et al.

It is certified that error appears in the above-identified patent and that said Letters Patent is hereby corrected as shown below:

In column 13, line 54 (claim 7), change "four" to --for--.

In column 16, line 67 (claim 20), change "load" to --motor--.

Signed and Sealed this

Fifth Day of October, 1993

Attest:

BRUCE LEHMAN

*Attesting Officer*         *Commissioner of Patents and Trademarks*